United States Patent [19]

Heyen et al.

[11] Patent Number: 5,361,390

[45] Date of Patent: Nov. 1, 1994

[54] METHOD FOR DISPLAYING AND CONFIRMING THE STATUS OF DEFERRED SYSTEM REQUESTS

[75] Inventors: John G. Heyen, Carrollton; Chander Kasiraj, Grapevine; Timothy J. Wolf, Bedford, all of Tex.

[73] Assignee: International Business Machines Corporation, Armonk, N.Y.

[21] Appl. No.: 277,583

[22] Filed: Nov. 29, 1988

[51] Int. Cl.⁵ .............................................. G06F 13/00
[52] U.S. Cl. ................................. 395/200; 364/281; 364/281.3; 364/284; 364/DIG. 1
[58] Field of Search ... 364/200 MS File, 900 MS File

[56] References Cited

U.S. PATENT DOCUMENTS

| | | | |
|---|---|---|---|
| 4,394,725 | 7/1983 | Bienvenu et al. | 364/200 |
| 4,458,331 | 7/1984 | Amezcua et al. | 364/900 |
| 4,615,001 | 9/1986 | Hudgins, Jr. | 364/200 |
| 4,630,196 | 12/1986 | Bednar, Jr. et al. | 364/200 |
| 4,649,473 | 3/1987 | Hammer et al. | 364/200 |
| 4,815,030 | 3/1989 | Cross et al. | 364/900 |
| 4,888,691 | 12/1989 | George et al. | 364/200 |

FOREIGN PATENT DOCUMENTS 0094496 11/1983 European Pat. Off. .

*Primary Examiner*—Allen R. MacDonald
*Assistant Examiner*—Glenn A. Auve
*Attorney, Agent, or Firm*—Douglas H. Lefeve; Andrew J. Dillon

[57] ABSTRACT

A method is disclosed for displaying and confirming the status of a plurality of deferred requests for processing by a system made by an end user of that system. Each request made by an end user is monitored and an indication of each deferred request is stored in a deferred status request list which acts as an electronic "out basket." The deferred status request list includes an indication of the date and time of each request as well as an indication of the type of request. In a preferred embodiment of the present invention an indication of the status of each deferred request is periodically generated and stored within the deferred status request list so that the end user may determine whether or not the request is pending, running, or completed. The end user may also selectively view the deferred status request list and alter the status of a selected request by deleting it, placing it in a hold status, or viewing the results of that request.

9 Claims, 2 Drawing Sheets

METHOD FOR DISPLAYING AND CONFIRMING THE STATUS OF DEFERRED SYSTEM REQUESTS

BACKGROUND OF THE INVENTION

1. Technical Field

This invention relates in general to distributed computing systems and in particular to methods whereby an end user may generate a plurality of deferred requests for such a system. Still more particularly, the present invention relates to a method whereby an end user may generate a plurality of requests for a distributed computing system without being logged into such a system.

2. Background Art

Distributed computing systems are well known in the prior art. Such systems permit a plurality of end users to be simultaneously coupled via a network to a central processor or alternatively, permit multiple computers to be coupled together in a so-called Local Area Network (LAN). Such systems permit multiple users to share computer assets, such as databases, computational facilities or electronic mail facilities. Often a user of such a distributed computing system may generate multiple requests for that computing system during periods of time when the system itself if unavailable or the user is not logged into the system. For example, a user may generate such requests while operating with a personal computer at home and wish to process those requests upon returning to and logging into a distributed computing system. Additionally, the assets required to process a particular request may not be available to the end user despite his being logged into the distributed computing system. In such cases it is often necessary to defer a particular request until the user is logged into the system, or until the desired asset is available.

One problem noted with modern distributed computing systems is related to the ability of an end user to make a plurality of requests of the system, all or part of which may be deferred by the end user or the system for later completion. The inability of an end user to correlate and confirm the status of multiple deferred requests represents an impediment to the efficient utilization of such systems.

Therefore, it should be apparent that a need exists for a method whereby an end user may simply and efficiently determine the status of multiple deferred requests made for processing at a later time by a distributed computing system. Additionally, a need exists for a method whereby an end user may visually display a listing of all such deferred requests associated with an indication of the status of each.

SUMMARY OF THE INVENTION

It is therefore one object of the present invention to provide an improved distributed computing system.

It is another object of the present invention to provide an improved distributed computing system including a method whereby the status of multiple deferred requests may be confirmed by the end user.

It is yet another object of the present invention to provide an improved distributed computing system including a method whereby the status of multiple deferred requests may be visually displayed in conjunction with a listing of all such deferred requests.

The foregoing objects are achieved as is now described. Each deferred request made by an end user for processing by a system is monitored and an indication of each such deferred request is stored in a deferred status request list which acts as an electronic "out basket." The deferred status request list preferably includes an indication of the date and time of each request as well as an indication of the type of request. In a preferred embodiment of the present invention an indication of the status of each deferred request is periodically generated and stored within the deferred status request list so that the end user may determine whether or not the request is pending, running, or completed. The end user may also selectively view the deferred status request list and alter the status of a selected request by deleting it, placing it in a hold status or viewing the results of that request.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
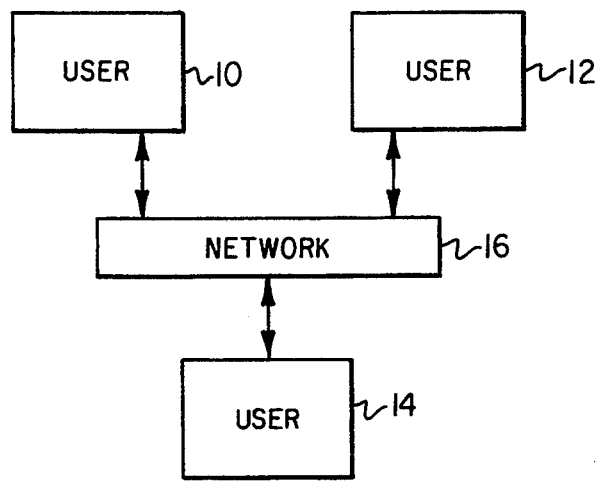
FIG. 1 is a block diagram of a distributed computing system which may be utilized in accordance with the method of the present invention.

With reference now to the figures and in particular with reference to FIG. 1, there is depicted a block diagram of a distributed computing system. As may be seen, the distributed computing system includes a plurality of users 10, 12, and 14 which are each coupled to a network 16. Those skilled in the art will appreciate that user 10, user 12 and user 14 may each constitute an interactive work station which is coupled to a central processing unit via network 16 or, in the alternative, each user may be implemented utilizing a personal computer coupled together via a Local Area Network (LAN), as represented by network 16. As those skilled in the art will appreciate each user may make a plurality of requests via network 16, all or part of which may be deferred by the system for later completion.

Figure 2:
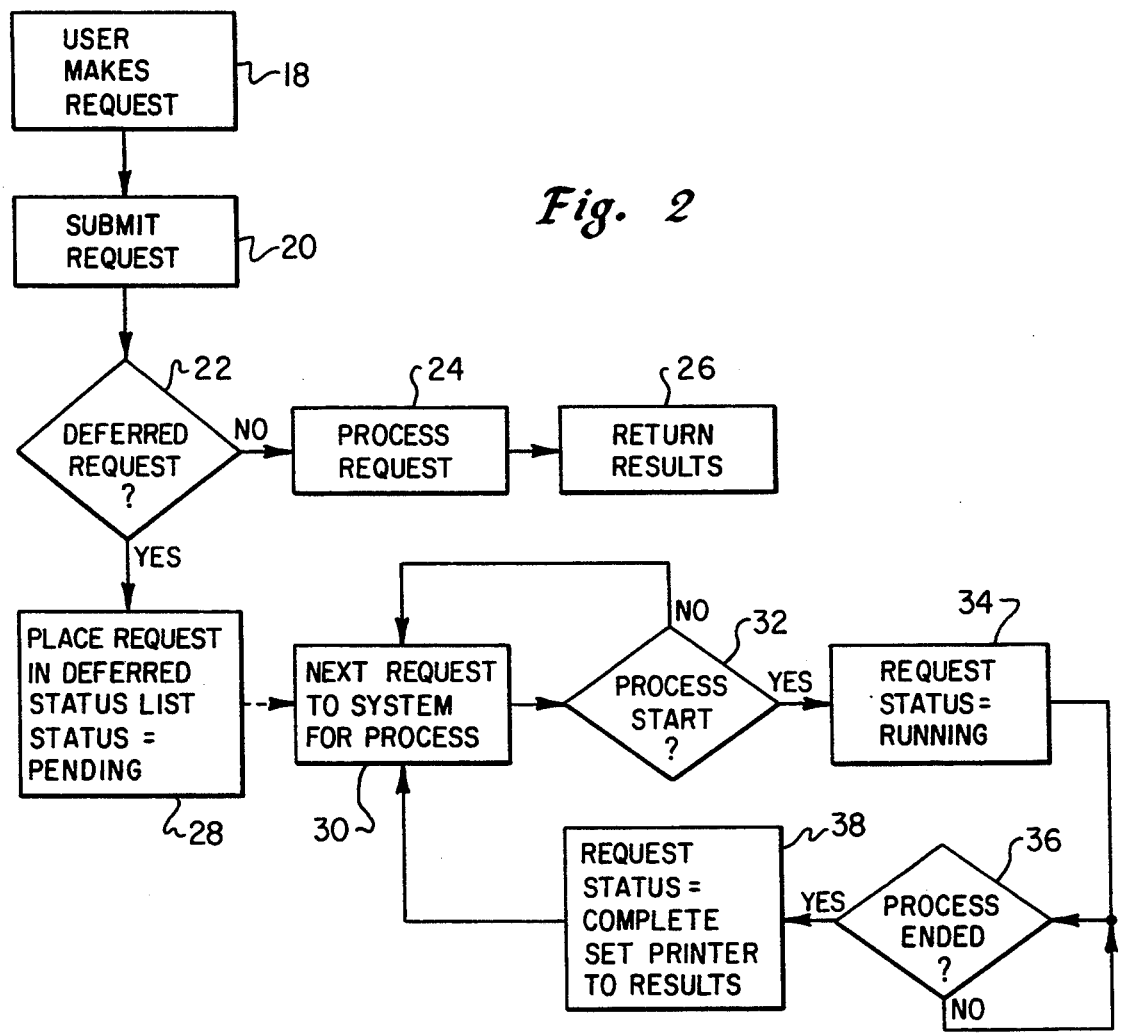
FIG. 2 is a logic flow chart of the method of the present invention whereby a deferred status request list may be created.

Referring now to FIG. 2, there is depicted a logic flow chart of the method of the present invention whereby a deferred status request list may be created. As may be seen, the process beings at block 18, which illustrates the end user making a request. A request made by the end user may be a direct request or may be a result of an object or action selected by the user which results in a request which must be processed. Thereafter, as depicted in block 20, the request generated by the end user's action is submitted to the system.

Block 22 depicts a determination of whether or not the request submitted to the system has been deferred. This may occur as a result of the nonavailability of a system asset required to process the request or due to the fact that the end user may be temporarily disconnected from the system. If not, the request is processed immediately, as illustrated in block 24 and the results of that request are returned to the end user, as illustrated in block 26.

In the event the request has been deferred for either reason stated above, then an indication of the deferred request is placed in a deferred status request list along with an indication that the status of this request is pending, as illustrated in block 28. Next, block 30 depicts the passing of a request to the system for processing. Thereafter, block 32 illustrates a determination of whether or not the process has begun and if not, the process returns to block 30 where another request to the system may be coupled to the system for processing.

In the event block 32 determines that the processing of a request has started, then block 34 illustrates the changing of that request status to "running" and the process passes to block 36 where a determination is made whether or not the processing has terminated. If not, the process is continually monitored until such time as the processing has ended. Thereafter, the process passes to block 38 where the request status is changed to complete and a pointer is set which points to the results of that request. The process then returns to block 30 in order to process another request, if additional deferred requests exist.

Upon reference to the foregoing specification, those skilled in the art will appreciate that the Applicants have disclosed a method whereby a deferred status request list may be generated in order to provide an end user with a simple and efficient manner to display and confirm the status of multiple deferred system requests.

Figure 3:
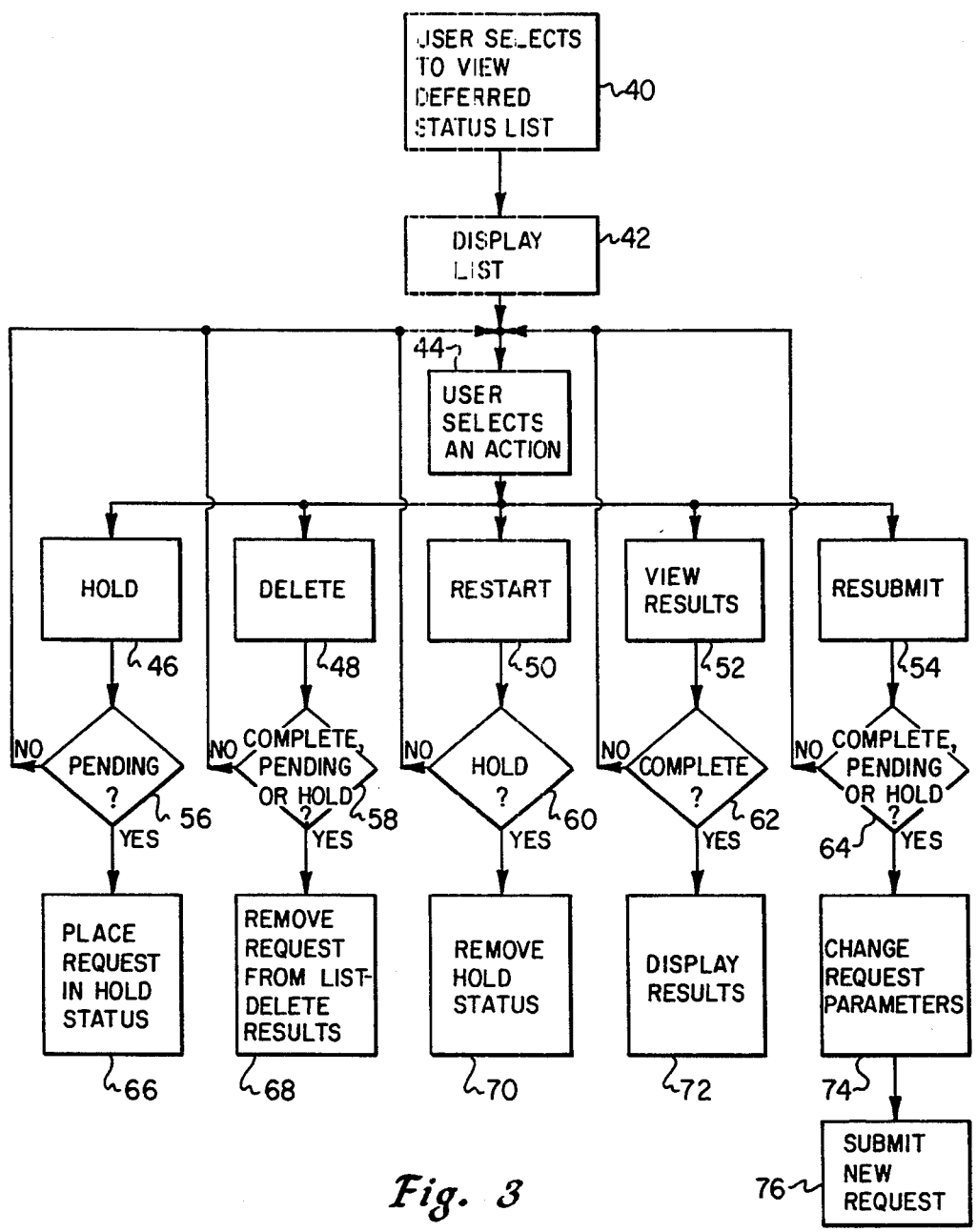
FIG. 3 is a logic flow chart illustrating the utilization of the deferred status request list of FIG. 2.

With reference now to FIG. 3, there is depicted a logic flow chart illustrating the utilization of the deferred status request list of FIG. 2. As may be seen, the utilization of the deferred status request list begins in block 40 with the user selecting to view the deferred status request list. Thereafter, block 42 illustrates the displaying of the list. Block 44 depicts the selection by the end user of one of a plurality of actions which may be accomplished with regard to an individual request displayed within the deferred status request list.

For example, the end user may select to place a particular request in a hold status, as depicted in block 46. Thereafter, block 56 is utilized to determine whether or not the particular request is still pending within the deferred status request list. If not, the process returns to block 44 to permit the end user to select another action. In the event the deferred request referred to is still pending within the deferred status request list, as determined by block 56, then block 66 illustrates the placing of that request in a hold status whereupon no further action will be taken until such time as the end user has modified this status.

Similarly, the end user may elect to delete a particular deferred request, as illustrated in block 48. As above, block 58 is then utilized to determine whether or not the deferred request selected by the user is in a complete, pending, or hold status within the deferred status request list. If not, the process returns to block 44 to allow the end user to select another action. In the event the deferred request selected by the end user is within the deferred status request list in a complete, pending, or hold status, then block 68 illustrates the removal of that request from the deferred status request list by the end user and a deletion of the results, if any.

The end user may also elect to restart a deferred request contained within the deferred status request list, as depicted in block 50. Thereafter, block 60 is utilized to determine whether or not the deferred request selected by the end user is in a hold status. If not, the process returns to block 44 where the end user may select another action. In the event the deferred request selected by the end user is contained within the deferred status request list in a hold status, then block 70 illustrates the removal of that request from the hold status and the replacing of that request in a pending status, in accordance with the desires of the end user.

Another action which may be selected by the end user is illustrated in block 52 whereby the end user may elect to view the results of a deferred request which has been completed. If the end user has elected to view results, then block 62 is next utilized to determine whether or not the deferred request has been completed. If not, the process returns to block 44 to permit the end user to select another action. If the process has been completed, as determined by block 62, then block 72 illustrates the displaying of the results in a manner consistent with the particular request.

Finally, the end user may elect to resubmit a particular deferred request, as depicted in block 54. Block 64 is then utilized to determine whether or not the deferred request selected is present within the deferred status request list in a complete, pending, or hold status. If the deferred request is not present within the deferred status request list then the process returns to block 44 to permit the end user to select another action. In the event the deferred request is present within the deferred status request list in a complete, pending, or hold status then block 74 illustrates the changing of the request parameters by the end user and thereafter a new request is submitted, as illustrated in block 76.

While the invention has been particularly shown and described with reference to a preferred embodiment, it will be understood by those skilled in the art that various changes in form and detail may be made therein without departing from the spirit and scope of the invention.

We claim:

1. A method in a data processing system for confirming the status of a plurality of deferred requests made by an end user of said data processing system, said method comprising the steps of:

monitoring within said data processing system each request made of said data processing system by an end user;

determining if each request made of said data processing system by said end user has been deferred within said data processing system;

recording an indication of each deferred request in a user viewable deferred status request list within said data processing system;

automatically monitoring within said data processing system the status of each deferred request recorded in said user viewable deferred status request list; and periodically recording within said user viewable deferred status request list an indication of the status of each deferred request recorded therein wherein a user may efficiently determine the status of all deferred requests upon a reference to said user viewable deferred status request list.

2. The method in a data processing system for confirming the status of a plurality of deferred requests made by an end user of said data processing system according to claim 1, further including the step of selectively altering the status of a selected one of said deferred requests in response to an input from said end user.

3. The method in a data processing system for confirming the status of a plurality of deferred requests made by an end user of said data processing system according to claim 2, wherein said step of selectively altering the status of a selected one of said deferred requests in response to an input from said end user comprises the step of deleting said selected one of said deferred requests.

4. The method in a data processing system for confirming the status of a plurality of deferred requests made by an end user of said data processing system according to claim 2, wherein said step of selectively altering the status of a selected one of said deferred requests in response to an input from said send user comprises the step of restarting said selected one of said deferred requests.

5. The method in a data processing system for confirming the status of a plurality of deferred requests made by an end user of said data processing system according to claim 2, wherein said step of selectively altering the status of a selected one of said deferred requests in response to an input from said send user comprises the step of placing said selected one of said deferred requests in a hold status.

6. The method in a data processing system for confirming the status of a plurality of deferred requests made by an end user of said data processing system according to claim 1, wherein said stored indication of each deferred request includes an indication of the date and time of said deferred request.

7. The method in a data processing system for confirming the status of a plurality of deferred requests made by an end user of said data processing system according to claim 1, wherein said stored indication of each deferred request includes an indication of the type of each deferred request.

8. A data processing system for confirming the status of a plurality of deferred requests made by an end user of said data processing system, said data processing system comprising:

means for monitoring within said data processing system each request made of said data processing system by an end user;

means for determining if each request made of said data processing system by said end user has been deferred within said data processing system;

means for recording an indication of each deferred request in a user viewable deferred status request list within said data processing system;

means for automatically monitoring within said data processing system the status of each deferred request recorded in said user viewable deferred status request list; and means for periodically recording within said user viewable deferred status request list an indication of the status of each deferred request recorded therein wherein a user may efficiently determine the status of all deferred requests upon a reference to said user viewable deferred status request list.

9. The data processing system for confirming the status of a plurality of deferred requests made by an end user of said data processing system according to claim 8, further including means for selectively altering the status of a selected one of said deferred requests in response to an input from said end user.

* * * * *